Figure 1:
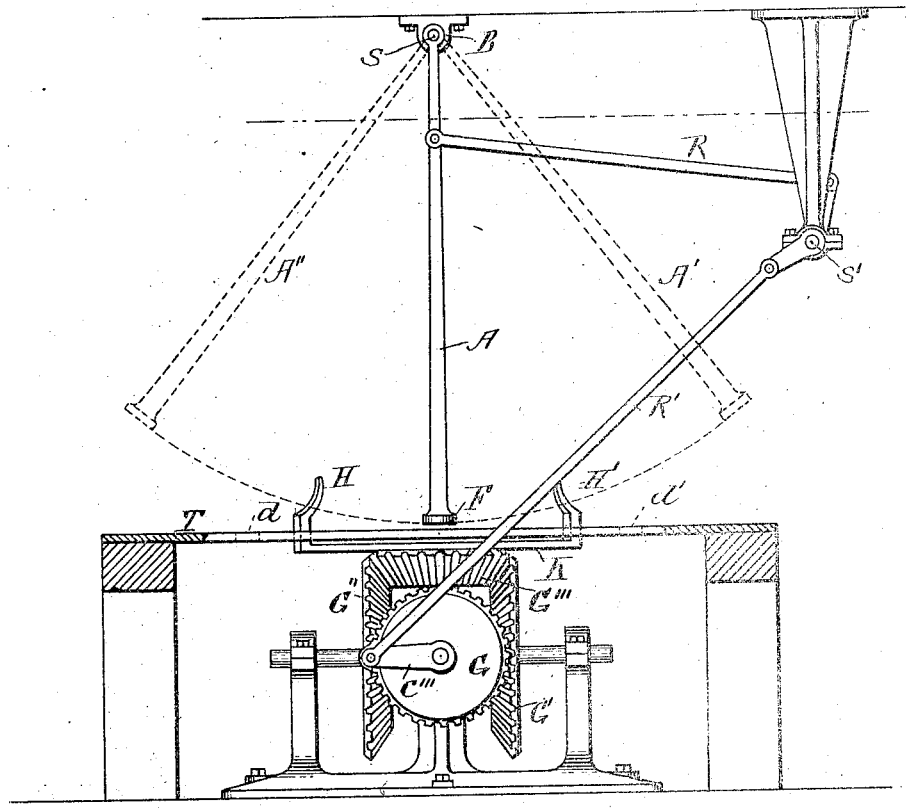

No. 832,384. PATENTED OCT. 2, 1906.
H. L. HILDRETH.
CANDY PULLING MACHINE.
APPLICATION FILED SEPT. 21, 1900.

2 SHEETS—SHEET 1.

WITNESSES:
Ellen B. Tomlinson.
Philip J. Doherty.

INVENTOR:
Herbert L. Hildreth
by Alex. P. Browne,
attorney.

No. 832,384. PATENTED OCT. 2, 1906.
H. L. HILDRETH.
CANDY PULLING MACHINE.
APPLICATION FILED SEPT. 21, 1900.

2 SHEETS—SHEET 2.

WITNESSES:
Ellen B. Tomlinson.
Philip J. Doherty

INVENTOR:
Herbert L. Hildreth
by Alex P. Browne,
attorney.

UNITED STATES PATENT OFFICE.

HERBERT L. HILDRETH, OF BOSTON, MASSACHUSETTS.

CANDY-PULLING MACHINE.

No. 832,384.　　Specification of Letters Patent.　　Patented Oct. 2, 1906.

Application filed September 21, 1900. Serial No. 30,703.

*To all whom it may concern:*

Be it known that I, HERBERT L. HILDRETH, a citizen of the United States, residing at Boston, in the county of Suffolk and State of Massachusetts, have invented certain new and useful Improvements in Candy-Pulling Machines, of which the following is a specification.

My invention relates to the manufacture of candy, and more particularly to candy-pulling. Its object is to provide a machine which may be driven by any suitable motor or source of power and which shall pull the candy supplied to it, producing a product equal to the best that has heretofore been obtained when the candy was pulled by hand.

Attempts have heretofore been made to work candy in a manner analogous to that in which dough and other substances are treated—that is to say, to place the mass within a receiving or supporting chamber into which moving arms project. An example of this construction is shown in United States Letters Patent No. 511,011, granted December 19, 1893, to P. J. G. Firchau. In such machines the mass of candy is supported in whole or in part by a chamber, and the function of the moving arms or projections is to alternately mass and stretch the material, as stated in said patent. This method of treatment and the machines which embody it are not successful or practical to produce the results heretofore obtained by hand-pulling, which results must be obtained in any successful candy-pulling machine.

My invention includes a pulling member or candy-puller, a plurality of what may be called "supports" for the candy or candy-hooks to which the batch of candy to be pulled is attached, and means for producing a relative in-and-out motion of these parts, to be hereinafter more fully described, whereby the candy is alternately pulled into hanks or strands and the hanks or strands so produced are reunited.

The relative in-and-out motion of the candy-puller and the candy-hooks may be realized by moving either the candy-puller or the candy-hooks, or both, and the mechanical devices by which this relative motion is accomplished are not essential to the invention.

As an illustration of the principles of my invention a specific embodiment thereof is shown in the drawings which accompany and form a part of this specification. In this particular form of the apparatus two candy-hooks are employed, and both the candy-puller and the candy-hooks are caused to move, thereby producing relative in-and-out motion of these parts; but no such joint motion is an essential of the invention, as will be hereinafter more fully explained, the essential parts of the invention being a plurality of candy-hooks, a candy-puller, and means of producing a relative in-and-out motion of these parts.

Figure 2:
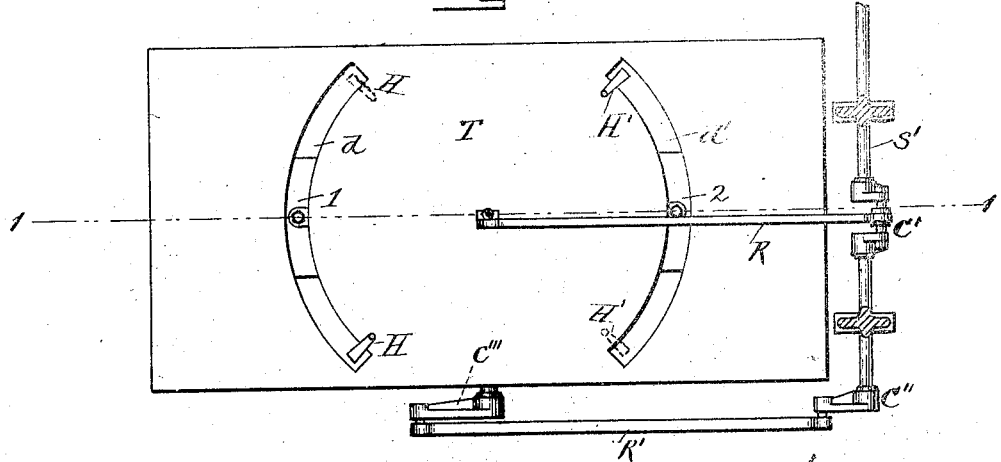
Figure 3:
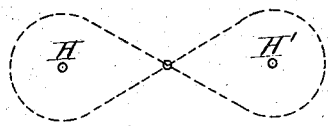
Figure 4:
Figure 4:
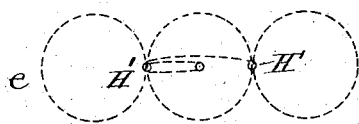
Figure 4:
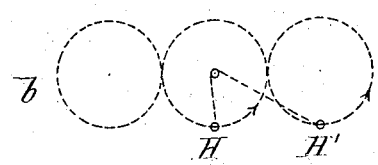
Figure 4:
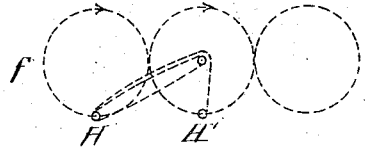
Figure 4:
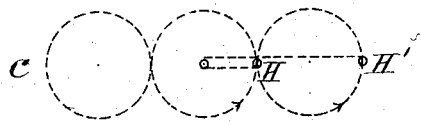
Figure 4:
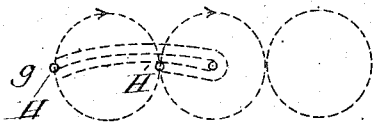
Figure 4:
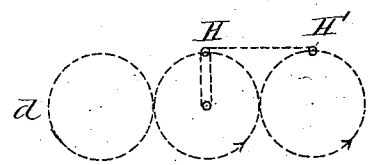
Figure 4:
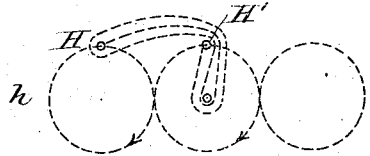
Figure 4:

Figures 1 and 2 are drawings showing a specific form of candy-pulling mechanism embodying my invention. Fig. 3 is a diagram illustrative of the in-and-out motion of the candy-puller relative to the candy-hooks. Fig. 4 is a diagram illustrative of the in-and-out motion of the candy-hooks relative to the candy-puller.

In Fig. 1, A is the movable pulling member or candy-puller. It is rigidly attached to a horizontal shaft or trunnion S, supported in the bearings B, and is free to oscillate about the axis of shaft S in the plane of the paper. A reciprocating motion is imparted to the candy-puller A by the rotation of a horizontal shaft S' through the intermediary of the double crank C' and connecting-rod R. In its reciprocating motion the candy-puller A oscillates between the two positions indicated by dotted lines at A' and A''. At its lower extremity the candy-puller preferably carries a flange or foot F, which serves to prevent the candy from slipping down.

H and H' are candy-hooks mounted upon the extremities of the horizontal walking-beam K, which is centrally and rigidly attached to the axis of the beveled gear G''', which forms part of the quadrantal gearing composed of the beveled gears G, G', G'', and G'''.

A quadrantal motion is imparted to the gearing by the rotation of the shaft S' through the intermediary of the crank C'', connecting-rod R', and crank C'''. The walking-beam K being rigidly attached to the axis of the gear G''', a reciprocating quadrantal motion is thereby imparted to it and to the candy-hooks H H', which oscillate in a horizontal plane.

T is a table or platform interposed between the candy-pulling mechanism and the driving-gear below.

Fig. 2 is a plan view of the table T and candy-hooks, showing also the shaft S' and the two cranks C' and C''. In this figure, *d* and $d'$ are two slots cut in the platform T to permit of the reciprocatory motion of the two candy-hooks H and H'. In the operation of the mechanism these candy-hooks oscillate between the positions H and H' and $H_1$ and $H_1'$, respectively.

In using the mechanism to pull candy the batch of candy is formed into a strand or hank, the ends of which are attached to the candy-hooks H and H', respectively. The mechanism is then set in operation, the result of which is that the candy-puller A catches the hank at its central point and extends it in two strands or hanks till the candy puller reaches the position shown at A'; but in the interval during which the candy-puller has moved from the position shown at A to the position shown at A' the candy-hook H' has moved from its initial position to its central position 2, Fig. 2, and the two hanks are reunited. On the return stroke of the candy-puller from the position shown at A' to the position shown at A the candy-hook H' moves from the position 2 to the position shown at $H_1'$, and the reunited strands are maintained at substantially the same length. The candy-puller next passes to the position shown at A'' and back to A, executing the same motions relative to the hook H as have just been described relative to the hook H', and this cycle is repeated, alternately pulling the candy into two strands and reuniting the strands as pulled.

Careful consideration will show that the relative motion of the puller to the candy-hooks, if the candy-hooks be regarded as stationary, is that shown diagrammatically in Fig. 3, in which, as in Figs. 1 and 2, H and H' indicate the candy-hooks and the dotted curved line in the shape of a figure 8 is the locus of the candy-puller relative to the candy-hooks. It is easily seen, therefore, that in the device described the candy-hooks need not be movable, but may be fixed to the platform, and that the candy-puller may have imparted to it two reciprocating motions at quadrature with each other without changing the results obtained. Similarly by developing the motion of the candy-hooks relative to the candy-puller a suitable motion of the candy-hooks is found, which if imparted to the candy-hooks while keeping the candy-puller fixed will not alter the function of the machine.

Fig. 4 illustrates diagrammatically the motion which may be imparted to the candy-hooks while keeping the candy-puller stationary in order to realize the hereinbefore-described in-and-out motion of the candy-hooks relative to the candy-puller. In this figure the circles shown in dotted lines indicate the loci of the candy-hooks H and H', a complete cycle during the operation of the machine being divided into eight equal intervals.

The successive positions of the candy-hooks during such cycle are shown, beginning at $a$, Fig. 4, in which the two hooks and the candy-puller are in line. They pass successively through the phases $b$ $c$ $d$ $h$ to $i$, in which latter phase they are again in the same line and about to repeat the cycle shown. In this diagram, moreover, the hanks or strands of candy are indicated by a dotted line or lines in such a manner as to illustrate the pulling of the candy.

Careful consideration of my invention as herein set forth will show that in practising it the mass of candy is not inclosed or supported within a chamber or receptacle, nor is it alternately stretched and massed. On the other hand, the candy is supported at all times during the pulling operation solely by means of the devices which I have hereinbefore spoken of as the "candy-hooks" or the "candy-puller," while the motions of these devices in the manner described operate to extend or stretch the candy and to produce lapping or reuniting of the pulled strands or hanks into position to be pulled or stretched again, but at the same time without massing the candy.

An examination of Fig. 4 in particular will show that by means of my invention there is no alternate massing and stretching, as in the prior art, but a stretching and lapping, as before explained.

It is to be noticed that in any machine embodying the invention hereinbefore set forth the question of whether or not the members which take part in the pulling operation should be more accurately designated as "supporting" members or as "pulling" members may depend in whole or in part upon the manner of their disposition with reference to the effect of gravity upon the candy during the pulling operation. For example, in the apparatus of Fig. 1 the parts or members H H' have a double function—that is, that being disposed horizontally they tend to support the candy which is connected to them against gravity and also serve to hold the ends of the candy batch against the pull of the part A. Hence the application of the expression "pulling member" or "candy-puller" to the part A is not to be taken as indicating that the parts H H', to which the term "support" is applied, may not also take part in the pulling operation. In the embodiment of my invention shown diagrammatically in Fig. 3, in which the so-called "supports" H H' are stationary and the "puller," so called, moves around and between H H', it is obvious that the function of supporting and pulling the candy may be shared by these parts in a manner dependent upon the planes in which they may be disposed with reference to gravity. The same is true of Fig. 4, wherein the two members above spoken of as "candy-supports" are shown as moving circularly with reference to a stationary so-called "candy-puller."

Having fully described my invention, I claim—

1. In a candy-pulling machine, in combination, a pair of pins or candy-pulling members a coöperating swinging pulling-lever, and means for moving one of said pair of members and said lever in intersecting paths, whereby they automatically feed and pull the candy.

2. In a candy-pulling machine, the combination of a pair of pulling members, means for imparting an arcuate movement to one of said members, a coöperating pulling member, and means for moving said last-named member so as to intersect the arcuate path of said first-named moving member.

3. In a candy-pulling machine, the combination of a pair of pulling members, means for moving one of said members in an arcuate path, an oscillating pulling member, and means for moving said oscillating member to intersect the arcuate path of said first-named moving member.

4. A candy-pulling machine comprising means for supporting the candy against gravity, means for pulling the candy, and means for producing a relative in-and-out motion of said supporting and pulling means.

5. A candy-pulling machine comprising means for supporting the candy against gravity, and means for pulling the candy, said pulling means being movable in and out with reference to said supporting means.

6. A candy-pulling machine comprising means for supporting the candy, means for pulling the candy, and means for producing an in-and-out motion of both said supporting and pulling means.

7. A candy-pulling machine comprising a plurality of candy-supports, pulling means, and means for moving said pulling means between said supports.

8. A candy-pulling machine comprising a plurality of candy-supports, pulling means, and means for moving said pulling means between and around said supports.

9. A candy-pulling machine comprising a plurality of candy-supports, pulling means, and means for moving said pulling means between and around said supports in a figure-8 path.

10. A candy-pulling machine having an oscillating beam carrying candy-supports on opposite sides of its center of oscillation, and a pulling member reciprocating across the path of motion of said supports.

11. A candy-pulling machine having a horizontally-disposed oscillating beam carrying candy-supports on opposite sides of its center of oscillation, and a pulling member reciprocating about a horizontal axis, and across the path of motion of said supports.

12. A candy-pulling machine having a pair of horizontally-disposed candy-supports, a pulling member, and means for oscillating said supports, and reciprocating said pulling member across said path of oscillation.

13. In a candy-pulling machine, a pair of candy-supports, a pivoted reciprocating pulling-lever having a puller at its free end swinging in a vertical plane, the swinging movement of the puller constituting the whole of the relative pulling movement of the puller and the supports, and means for imparting opposite, reciprocating, position-shifting movements to the respective supports which bring them alternately on opposite sides of the path of the puller.

14. In a candy-pulling machine, a candy-puller having a flaring or spreading free end.

15. In a machine for pulling candy, pulling members movable relatively to each other for continuously pulling the strands of candy.

16. In a machine for pulling candy, pulling members movable relatively to each other for continuously pulling the candy and for intermittently lapping the strands of candy.

In testimony whereof I have hereunto subscribed by name this 12th day of September, 1900.

HERBERT L. HILDRETH.

Witnesses:
CHAS. C. KURTZ,
ALEX. P. BROWNE.